Nov. 6, 1945.  P. J. McCULLOUGH  2,388,335

COFFEE MAKER

Filed Sept. 5, 1942

INVENTOR;
PAUL J. McCULLOUGH

BY Rodney Bedell
ATTORNEY

Patented Nov. 6, 1945

2,388,335

UNITED STATES PATENT OFFICE 2,388,335

COFFEE MAKER

Paul J. McCullough, St. Louis, Mo., assignor to Joseph Pavelka, St. Louis, Mo.

Application September 5, 1942, Serial No. 457,423

7 Claims. (Cl. 99—292)

The invention relates to coffee making machines of the type in which boiling water is passed through the ground coffee preferably but a single time, to extract or infuse the coffee, as distinguished from coffee pots in which the coffee and the initial water are boiled in a common chamber and from ordinary drip coffee makers in which the water at different temperatures below boiling may drip through a chamber containing the ground coffee and from percolators of the type in which small quantities of water are circulated through the coffee a number of different times.

The main object of the invention is to provide for an adequate supply of boiling water to the ground coffee and for maintaining the infused product hot enough for drinking but below the boiling point so that recirculation through the ground coffee is avoided.

Another object of the invention is to provide automatic control of the heating elements.

Another object of the invention is to facilitate the cleaning of the apparatus and to facilitate the handling of the chamber containing the infused product separately from the remainder of the machine.

Another object of the invention is to simplify the construction so as to reduce initial expense and to avoid early replacement or repair of parts.

These and other detail objects of the invention are attained by the structure illustrated in the accompanying drawing in which.

Figure 1:
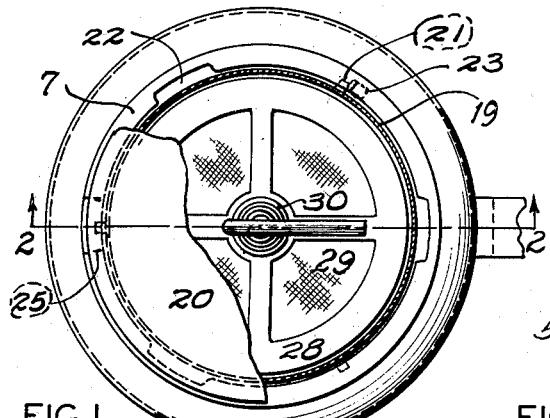
Figure 1 is a top view, sectioned in part, horizontally of the device.

The machine may be described briefly as comprising two sections, a lower stove and boiler bowl A and an upper coffee-containing and infusing bowl B.

The lower bowl has a cylindrical side wall 1 with an open upper end terminating in an upstanding rim 2 on which the upper bowl is seated. The bowl includes a bottom wall 3 which may be offset as indicated at 4 to facilitate the mounting of the heating, switch and other control equipment below the bottom wall. This equipment may be enclosed in a casing 5 to present a better appearance but this casing does not constitute any portion of the wall proper of the bowl.

The upper bowl B has a cylindrical side wall 6 with an open upper end terminating in an inturned rim 7. Bowl B includes a bottom wall 8 shouldered at 9 to provide a seat for an annular gasket 10 of rubber-like material by which the upper bowl is seated on rim 2 of the lower bowl. A lip 11 on bottom wall 8 retains the gasket. Inwardly of the gasket, bottom wall 8 is again shouldered at 12 and depending through a central aperture is a sleeve 13 extending downwardly to a point near but substantially spaced from bottom wall 3 of the lower bowl.

Freely slidable in sleeve 13 is a tube 14 slotted at 15 to receive a screw 17 inserted through sleeve 13 and limiting the telescoping movement of the tube and sleeve. The slot is of sufficient length to insure contact between the lower end of tube 14 and bottom wall 3 of the lower bowl A. A plurality of grooves 18 in the lower end of tube 14 provide for admission of water to the interior of the tube.

A detachable lid 20 is seated upon rim 7 of the upper bowl and includes a depending wall 19 provided with radial lugs 21 receivable in recesses 22 in rim 7 forming a bayonet joint whereby a slight rotation of the lid after being seated upon the rim will block the lid against upward movement from the rim. The rim may include a stop 23 engaging one of the lugs 21 to limit rotation of the lid at a point where all of the lugs 21 underlie a portion of the rim.

The upper portion of the lid wall 19 is perforated as indicated at 24 and several lugs 25 project from wall 19 a greater distance than rim recesses 22 to hold the lid in position so that the interior of bowl B is always in communication with the atmosphere. This provides a relief against excessive steam pressure in the upper bowl.

Received in annular recess 26 in the bottom wall of bowl B is a wheel-like frame member 27 and cooperating therewith is a second wheel-like frame member 28 of slightly larger diameter than recess 26. A renewable net or fine mesh strainer cloth 29 has its marginal edge clamped between frames 27 and 28 which are thrust together by a helical spring 30, the upper end of which is reduced in diameter as indicated at 31 and closely surrounds a rod 32 and is held against sliding on the rod by a pin 39.

Rod 32, having a hook or crank 33 at the top of bowl B, extends downwardly into sleeve 13 where it is provided with a flat bar extension 34 having an apertured flange 35 at its lower end. A flat spring 36 is secured at its upper end to extension 34 and extends downwardly through the aperture in flange 35 and terminates in a lip 37 disposed to engage a notch in an upstanding cone-like knob 38 projecting upwardly from the bottom wall of the lower bowl A. The lower end of the spring thrusts frames 27 and 28 downwardly against a shoulder 40 formed by the upper end of bar 34 when the rod and frames are removed from the bowl.

When upper bowl B is placed on top of lower bowl A, rod 32 and the parts mounted thereon may be inserted in the upper bowl, and the rod extension 34 and the spring mounted thereon may be inserted into sleeve 13 and tube 14 until frame 28 strikes the bottom wall of the upper compartment whereupon downward pressure on hook 33, acting through pin 39, compresses coil spring 30. Lip 37 on flat spring 36 rides into the recess provided therefor in knob 38, thus locking the upper and lower bowls A and B together and, by means of the compressible gasket 10, forming a seal between them.

Figure 2:
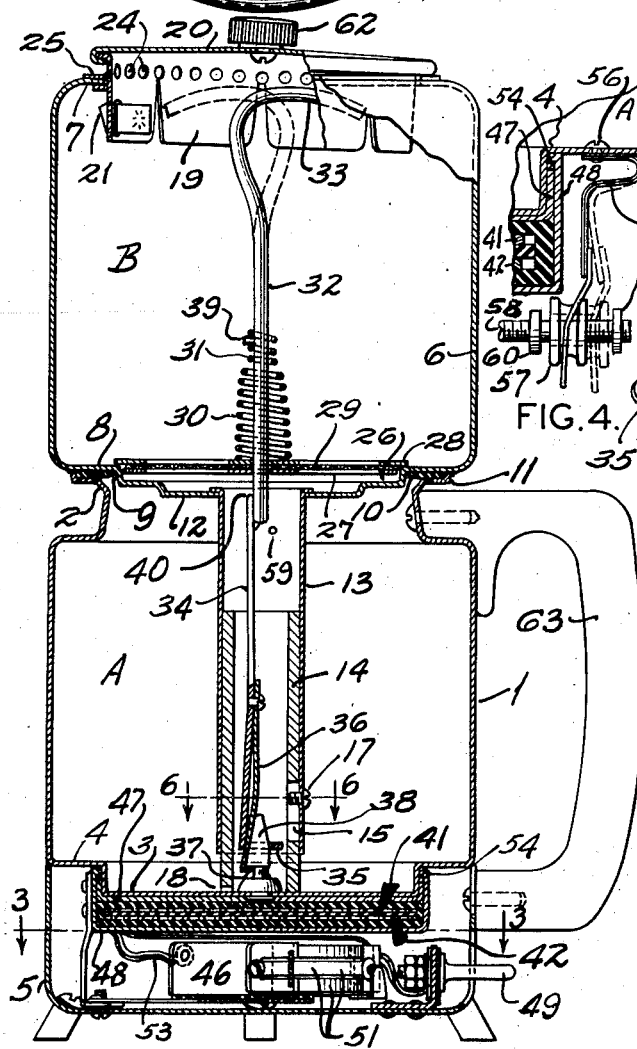
Figure 2 is a vertical longitudinal section with parts shown in elevation through the center of the device as indicated on the line 2—2 of Figure 1.
Figures 4, 5, 6:
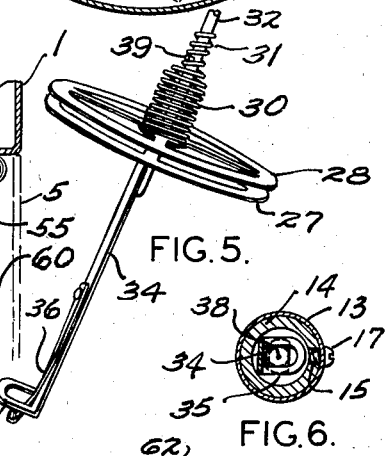
Figure 4 is a detail vertical section taken on the line 4—4 of Figure 3 and drawn to an enlarged scale.
Figure 5 is an isometric detailed view of a portion of the structure which holds the bag containing the ground coffee.
Figure 6 is a detail horizontal section taken on the line 6—6 of Figure 2.

When it is desired to separate the containers, lid 20 is removed, hook 33 is rotated approximately 180° from the position shown in Figure 2, bringing lip 37 of the flat spring around to the unshouldered portion of knob 38 and thus relieving bar 34 whereupon it and frames 27, 28 may be withdrawn as a unit, indicated in Figure 5. Upon holding rod 32 on bar 34 with one hand and rotating spring 30 in an anticlockwise direction with the other hand, the spring may be fed upwardly until the small diameter coils 31 are disengaged from pin 39 whereby the spring and frames 27, 28 with cloth 29 may be slid upwardly off of rod 32 for more thorough cleaning or, if necessary, for replacement of the cloth.

The heater comprises two resistance elements 41 and 42 disposed immediately below and extending substantially throughout the full area of bottom wall 3 of the lower bowl. They are completely insulated from each other and from the adjacent portions of the bowl. One of them is a high temperature unit of approximately one thousand watts capacity and the other is a low temperature unit of approximately twenty-three watts capacity.

Figure 3:
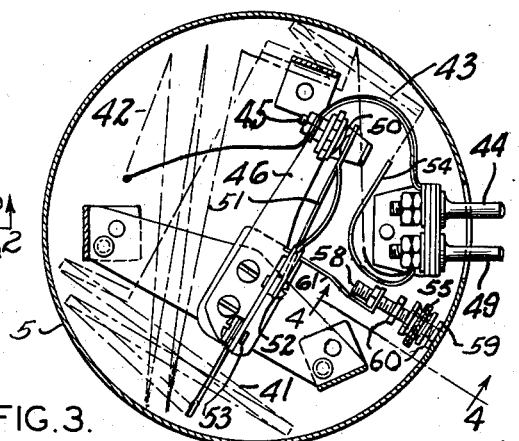
Figure 3 is a top view of the "stove" portion of the device and is taken approximately on the line 3—3 of Figure 2.

The machine is provided with terminals 44 and 49 (Figure 3) adapted to be received in the usual plug by which the machine circuits may be connected to a house wiring circuit. A bus bar 43 leads from terminal 44 to a switch post 45 mounted on but insulated from a bracket 46. The low temperature unit 42 consists of a coil of relatively fine resistance wire, one end of which is connected to post 45 and the other end of which is connected to the inner end of terminal 49. The circuit for this unit is permanently closed between terminals 44 and 49.

A switch blade 51 has one end 52 mounted on bracket 46 but insulated therefrom and extends abreast of post 45. Post 45 and switch blade 51 have opposing buttons 50 arranged to contact each other when the switch blade is in the normal position indicated in Figure 3. The switch blade is of the "grasshopper" type in which the spring-like quality of the switch blade tends to resist its movement from an on or an off position and tends to snap it to the opposite position when the initial resistance of the spring is overcome.

The high temperature unit 41 consists of a coil of relatively heavy resistance wire, one end of which is connected at 53 to bracket 46 and the other end of which is connected to the inner end of post terminal 49. The circuit for the high temperature unit is completed by switch blade 51, contacts 50, post 45 and bus bar 43, and this circuit is always controlled by a bimetal thermostat 55 (Figure 4) which is anchored at 56 to the lower bowl bottom wall and depends therefrom with its lower free end forked and received in a peripheral groove in a collar 57 slidable along a threaded rod 58 screwed into the nut-like outer end of a link 61 (Figure 3), the inner end of which is connected to switch blade 51.

Stops 60 are adjustably mounted upon rod 58 and determine the free sliding movement of collar 57 along the rod and comprise calibrating means, whereby the amount of lost motion between the thermostat and rod 58 and switch blade 51 may be set to effect opening of the switch upon the thermostat reaching a pre-determined relatively high temperature and closing the switch upon the thermostat thereafter reaching a pre-determined relatively low temperature. Obviously the thermostat will have a substantial range of movement between these pre-determined temperatures without effecting movement of the switch blade. More specifically, elements 51, 55, 57, 58, 60 and 61 will be so adjusted that, when the thermostat is heated, collar 57 will not engage outer element 60 until the temperature of the thermostat is approximately 212°; nor, when the thermostat is cooled, will the collar engage the inner element 60 until the temperature is below approximately 150°.

The formation of the lower portion of the boiler and of the heating elements and the assembly of these parts is simplified by the construction illustrated in Figure 2 in which a relatively heavy cup-like bottom plate 47 is applied over the bottom wall 3 of the boiler bowl A, the upper edge of cup 47 being spaced from the bottom of offset 4 to provide an upwardly facing ledge. Heating elements 41 and 42 and the insulation between them and above and below them are complete discs fitting in a member 48, and the side wall of the latter has an inturned upper lip 54 fitting over the ledge formed by the side of cup 47. Member 48 is divided diametrically, as indicated at 48a (Figure 7) and its two halves are assembled with the remainder of the structure by sliding them towards each other with their lips 54 inserted in the groove formed by the ledge of cup 47. The two halves of member 48 are then welded or brazed to each other or to the offset portions 4 of the boiler A and the heating elements are securely assembled with the remainder of the structure without perforations through the element or insulation discs and without inserting screws through them which would have to be insulated to avoid short circuits.

*Operation.*—When coffee is to be made, water is poured into the lower bowl. The upper bowl is then placed in position, the locking bar and associated parts inserted and the upper and lower bowls locked to each other. The required amount of ground coffee is then placed in the upper bowl, the lid applied and terminals 44 and 49 connected to a suitable source of electric current. The high temperature unit 41, assisted somewhat by low temperature unit 42, will quickly raise the temperature in boiler A. The air therein will expand and be driven off through one or more suitable apertures 59 in sleeve 13, thus avoiding premature air pressure upon the water which would tend to force it up through extension tube 14 and sleeve 13 before it had been heated to the boiling point. As the temperature reaches the boiling point and steam is generated in the boiler, the steam pressure will force the unevaporated water through notches 18 into tube 14 and upwardly through sleeve 13, cloth 29 and the ground coffee into the upper bowl. It will be understood that aperture 59 will be too small to permit the escape of sufficient steam to affect its operating pressure on the water in the boiler.

About the time the temperature reaches the boiling point, the thermostat is actuated to the broken line position indicated in Figure 4 to open the switch 50, 51 controlling the high temperature heating element. The latent heat in the boiler parts will continue the boiling operation until substantially all of the water in the lower bowl has been evaporated whereupon, steam pressure being eliminated, the liquid in the upper bowl will drain downwardly through the ground coffee and cloth 29, sleeve 13 and tube 14 back into the lower bowl and the coffee will be ready to drink.

The low temperature heating element will remain energized so long as the machine is plugged in, but its limited heat will not boil the liquid in the lower bowl and the thermostat will not close the switch until after the connection to the house circuit has been broken (or cold water poured into the boiler) and the thermostat cooled substantially below the temperature at which it is desired to maintain the coffee prior to pouring it out for use. Hence the liquid in the machine, after once being boiled and passed through the ground coffee, will not be recirculated. This avoids repeated infusion with resulting extraction of deleterious elements of the coffee.

Upon completion of the infusion process, lid 20 is removed, hook 33, which is no longer too hot to handle, is turned to the broken line position shown in Figure 2, unlocking the bowls from each other, and the upper bowl removed either by grasping it directly or by reapplying the lid to the upper bowl, securing it in place by the bayonet joint device, and then lifting the upper bowl from the lower bowl by the lid handle 62. When the bowls are assembled, the flat gasket is compressed by spring 30 but when this spring pressure is released the bowls are easily separated, thus avoiding the sticking and difficult separation of the bowls which is characteristic of coffee makers of this type where a conical type gasket is used between the bowls to insure a tight seal.

Figure 7:
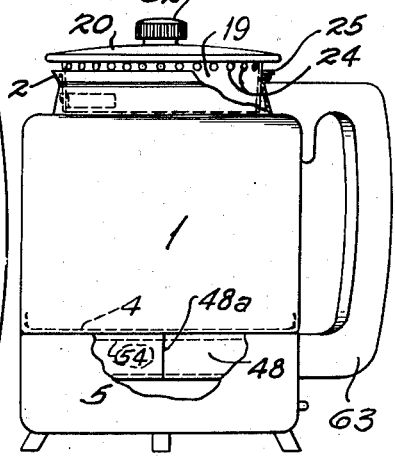
Figure 7 is a side elevation of the lower portion of the device with the upper portion removed and the lid applied to the lower portion.

Lid 20 may then be placed upon the lower bowl as indicated in Figure 7, lugs 25 holding the edge of the lid spaced above the bowl rim 2 to provide a passage for pouring the coffee through apertures 24. The bowl may be tilted in any direction as coffee will flow easily over rim 2 and no spout arrangement is required. The bowl is provided with a handle 63 preferably of wood, plastic, or other insulating material.

The device ordinarily controls the temperature so that it is unnecessary for the user to operate a high and low switch to avoid repeated infusions or unduly high temperature of the contents. The heating element being applied directly to the entire area of the bottom of the lower bowl results in quicker boiling action than would be possible if the bowl bottom had a "well" portion of restricted diameter at its center, to insure the immersion of the lower end of the tube of the upper bowl as is present in coffee makers of this type previously used, and the heating element apertured to surround the "well" portion. I have found it unnecessary to completely bare the metal to which the thermostat is attached in order to secure satisfactory operation of the thermostat, and accordingly the device will operate irrespective of the presence of sliding tube 14. However, the use of this tube makes it possible to maintain a constant depth of liquid over the boiler bottom wall 3 before steam may escape into tube 14 irrespective of variations in the thickness of gasket 10 or in the height of boiler A or the length of sleeve 13 or other variations in the manfacture.

While reference is made repeatedly herein to coffee making, it will be understood that the device may be used for any similar infusion process and the details of the construction may be varied substantially without departing from the spirit of the invention, and the exclusive use of those modifications coming within the scope of the claims is contemplated.

What is claimed is:

1. In a coffee maker, a liquid container forming a boiler chamber with an upwardly facing annular rim, an elevated bowl with its bottom wall seated on said rim and provided with a depending tube open at both ends, the lower end of the tube extending to the lowermost portion of the container and the container being sealed from the atmosphere except through said tube, an upstanding knob on said container bottom wall extending into the lower portion of said tube and having a lateral recess forming a downwardly facing shoulder, an elongated member accessible through the top of the bowl and provided with means engaging the upper face of the bottom wall of the bowl and extending downwardly through said tube and terminating at its lower end in a latch disposed to engage said shoulder to lock the bowl and container together.

2. Structure as described in claim 1 in which the upper end of the elongated member is adapted to be rotated manually about its axis and the knob on the bottom wall of the container forms a cam for releasing the latch on the elongated member when the latter is rotated.

3. Structure as described in claim 1 in which the upper end of the elongated member is provided with a radially extending handle by which the member may be rotated about its axis, and the knob on the bottom wall of the container forms a cam for releasing the latch on the elongated member from the shoulder on the knob when the elongated member is rotated approximately 180° whereby the handle at the upper end of the elongated member forms a visible signal indicating when the parts are secured together and when they are released.

4. In a coffee maker, a liquid container forming a boiler chamber with an upwardly facing annular rim, an elevated bowl with its bottom wall seated on said rim and including a depending tube open at both ends, the lower end of the tube extending to the lowermost portion of the container and the container being sealed from the atmosphere except through said tube, an upstanding knob on said container bottom wall extending into the lower portion of said tube and having a lateral recess forming a downwardly facing shoulder, an elongated member accessible through the top of the bowl, a strainer mounting flat frame slidable on said member and extending radially therefrom and engaging the top face of the bottom wall of the bowl, a coil spring surrounding the elongated member, the lower end of the spring being seated on the frame member, said elongated member extending downwardly through said tube to engage said recess, an element on said elongated member spaced above said flat frame to form a seat for the upper end of said spring and to thrust the spring against said flat frame and thereby hold the latter against the bottom wall of the bowl and hold the bowl against its seat on the rim of the boiler chamber.

5. Structure as described in claim 4 in which the elongated element has a shoulder below the frame for limiting the spring thrust movement of the frame on the elongated member when the elongated member is unlatched from the container knob.

6. In a coffee maker, a liquid container forming a boiler chamber with an upwardly facing annular rim, an elevated bowl with its bottom wall seated on said rim and including a depending tube open at both ends, the lower end of the tube extending to the lowermost portion of the container and the container being sealed from the atmosphere except through said tube, said bowl having an open top with an annular rim, a lid applicable to the open top of the bowl and having an annular vertical flange and provided with lugs resting upon the bowl rim to hold the upper portion of the flange above the bowl rim, the upper portion of the flange having apertures to provide for the escape of steam, said lid being applicable also to said container rim when the bowl is removed from the container and providing for the pouring out of the contents of the container through said apertures.

7. Structure as described in claim 4 in which the upper coils of the spring closely surround the elongated member and the lower coils of the spring increase in diameter and the spring seating element on the elongated member comprises a transverse pin arranged to engage and disengage the spring coils when the spring and the elongated member are rotated relative to each other, whereby the spring and the frame may be removed from the elongated member.

PAUL J. McCULLOUGH.